US 6,666,489 B2

(12) United States Patent
Kruger

(10) Patent No.: US 6,666,489 B2
(45) Date of Patent: Dec. 23, 2003

(54) SEALED GRIPPER APPARATUS

(75) Inventor: Dean J. Kruger, Jeddo, MI (US)

(73) Assignee: BTM Corporation, Marysville, MI (US)

( * ) Notice: Subject to any disclaimer, the term of this patent is extended or adjusted under 35 U.S.C. 154(b) by 98 days.

(21) Appl. No.: 09/938,212

(22) Filed: Aug. 23, 2001

(65) Prior Publication Data

US 2003/0038492 A1 Feb. 27, 2003

(51) Int. Cl.[7] .............. B66C 1/00; B25B 1/08; B23Q 3/08
(52) U.S. Cl. ............. 294/88; 294/104; 294/116; 269/32; 269/229
(58) Field of Search ................. 294/88, 116, 103.1, 294/104, 106, 115; 72/328; 269/32, 34, 229, 231, 233, 239; 901/37

(56) References Cited

U.S. PATENT DOCUMENTS

| | | | |
|---|---|---|---|
| 3,482,830 A | * 12/1969 | Sendoykas | 269/32 |
| 4,458,889 A | * 7/1984 | McPherson et al. | 269/32 |
| 4,494,739 A | * 1/1985 | Valentine | 269/32 |
| 4,519,279 A | * 5/1985 | Ruggeri | 294/116 |
| 4,854,564 A | * 8/1989 | McPherson et al. | 269/32 |
| 5,085,480 A | 2/1992 | Jackson | 294/88 |
| 5,171,001 A | * 12/1992 | Sawdon | 269/32 |
| 5,284,375 A | * 2/1994 | Land, III | 294/88 |
| 5,301,533 A | * 4/1994 | Jackson | 72/328 |
| 5,481,951 A | * 1/1996 | Kiefer | 82/162 |
| 5,575,462 A | 11/1996 | Blatt | 269/32 |
| 5,823,519 A | * 10/1998 | Tunkers | 269/32 |
| 5,845,897 A | 12/1998 | Tunkers | 269/32 |
| 5,853,211 A | 12/1998 | Sawdon et al. | 294/88 |
| 5,884,903 A | * 3/1999 | Sawdon | 269/32 |
| 5,938,259 A | 8/1999 | Sawdon et al. | 294/88 |
| 5,941,513 A | 8/1999 | Moilanen et al. | 269/32 |
| 6,048,013 A | 4/2000 | Moilanen et al. | 294/88 |
| 6,056,281 A | 5/2000 | Moilanen et al. | 269/32 |
| 6,079,896 A | * 6/2000 | Dellach | 269/32 |
| 6,115,898 A | * 9/2000 | Sawdon | 29/243.5 |
| 6,125,684 A | 10/2000 | Moilanen et al. | 72/407 |
| 6,176,533 B1 | 1/2001 | Moilanen et al. | 294/88 |
| 6,412,845 B1 | * 7/2002 | Sawdon et al. | 294/88 |

FOREIGN PATENT DOCUMENTS

| | | | |
|---|---|---|---|
| EP | 596808 | * | 5/1994 |
| EP | 615817 | * | 9/1994 |

* cited by examiner

Primary Examiner—Eileen D. Lillis
Assistant Examiner—Paul T. Chin
(74) Attorney, Agent, or Firm—Harness, Dickey & Pierce, P.L.C.

(57) ABSTRACT

A gripper includes a body, an actuator movably supported by the body and a first hub rotatably supported by the body where the first hub rotates about a transverse axis. The gripper also includes a drive arm having a camming surface. The drive arm is coupled to the first hub so as to be rotatable about the transverse axis. A member drivingly interconnects the camming surface and the actuator such that an arm coupled to the first hub operably moves in response to the actuator.

36 Claims, 5 Drawing Sheets

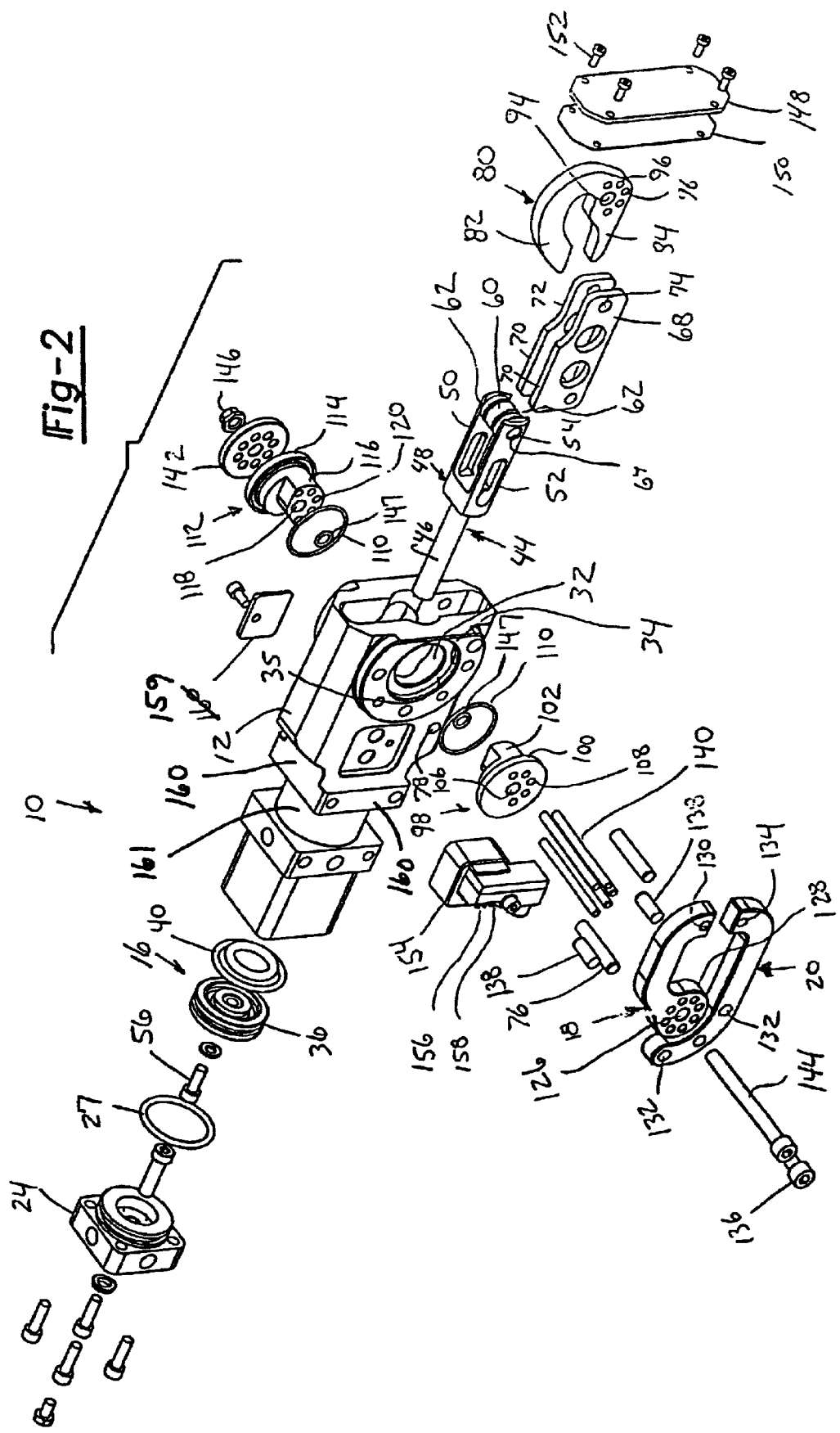

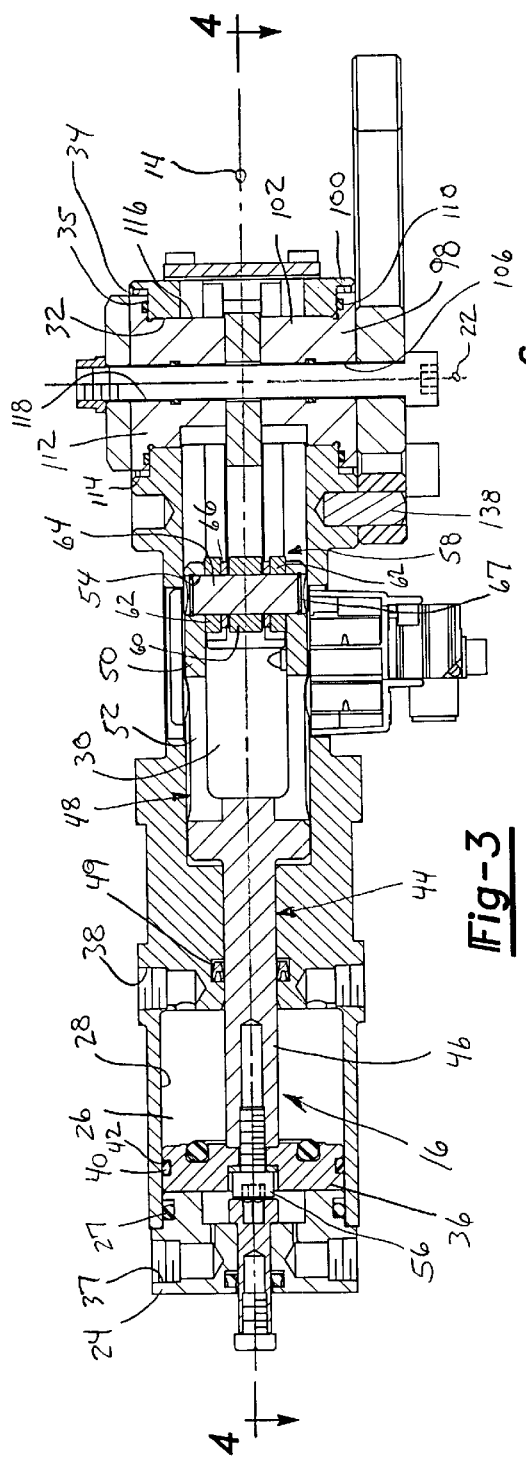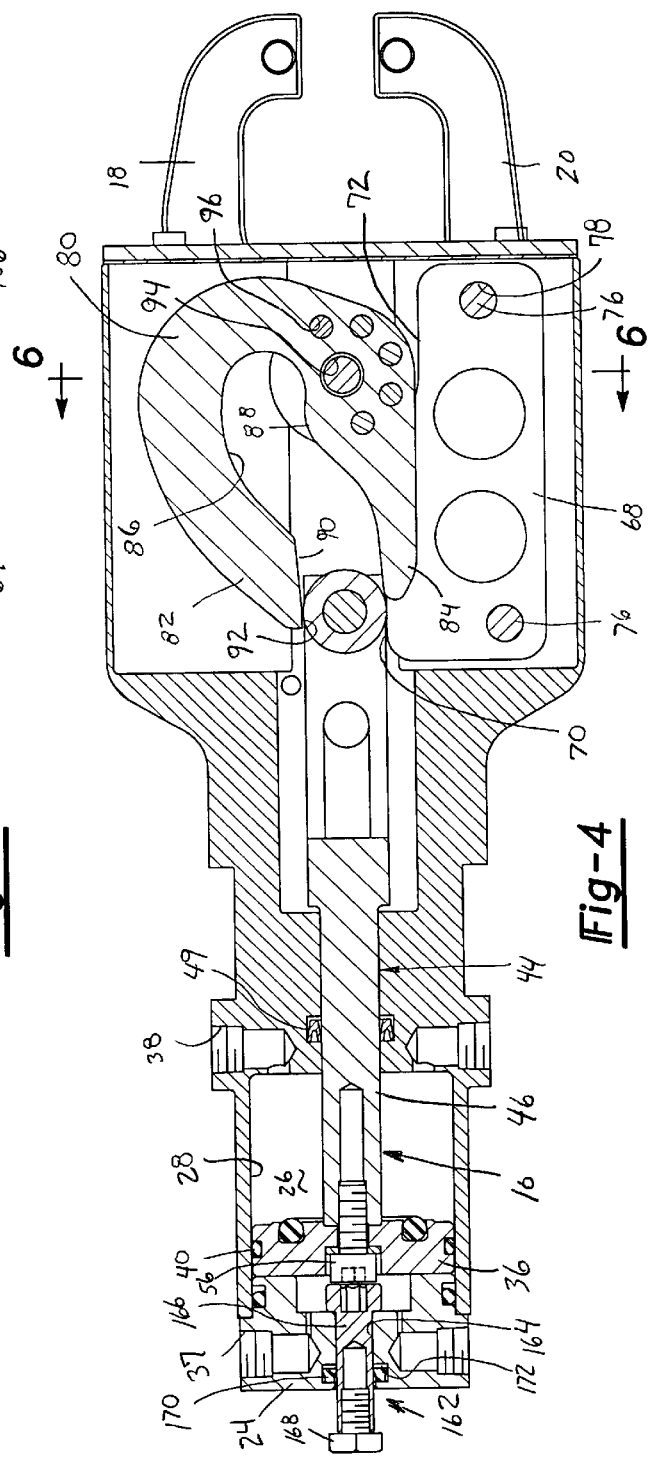

SEALED GRIPPER APPARATUS

BACKGROUND AND SUMMARY OF THE INVENTION

The present invention relates to a gripper for grasping objects and, more particularly, to a sealed gripper for holding work pieces in adverse environments.

Grippers are commonly used in conjunction with robots in industrial applications for picking, placing and fixturing work pieces during the various steps of manufacturing a final component. Typical grippers include pneumatically or hydraulically actuated cylinders, which cause one or more arms to move through a desired range of motion to grasp a work piece.

Unfortunately, when a mechanism such as a gripper is to be sealed to prevent ingress of contamination, one or more design features are often compromised. Specifically, a sealed mechanism is usually much larger than its unsealed counterpart due to the requirements of internal levers, cams and seals. Additionally, in the case of the gripper, it is often difficult to seal rotating hubs without increasing the size of the overall packaging envelope.

In accordance with the present invention, a gripper includes a body, an actuator movably supported by the body, and a first hub rotatably supported by the body where the first hub rotates about a transverse axis. The gripper also includes a drive arm having a camming surface. The drive arm is coupled to the first hub so as to be rotatable about the transverse axis. A member drivingly interconnects the camming surface and the actuator such that an arm coupled to the first hub operably moves in response to the actuator.

Additional benefits and advantages of the present invention will become apparent to those skilled in the art to which this invention relates and from the subsequent description of the preferred embodiment and the appended claims, taken in conjunction with the accompanying drawings.

BRIEF DESCRIPTION OF THE DRAWINGS

FIG. 2 is an exploded perspective view of the sealed gripper constructed in accordance with the teachings of the present invention;

FIG. 3 is a cross-sectional top view of the preferred embodiment sealed gripper taken along line 3—3 of FIG. 1;

FIG. 4 is a cross-sectional side view of the sealed gripper of the present invention taken along line 4—4 of FIG. 3;

DETAILED DESCRIPTION OF THE PREFERRED EMBODIMENT

Figure 1:
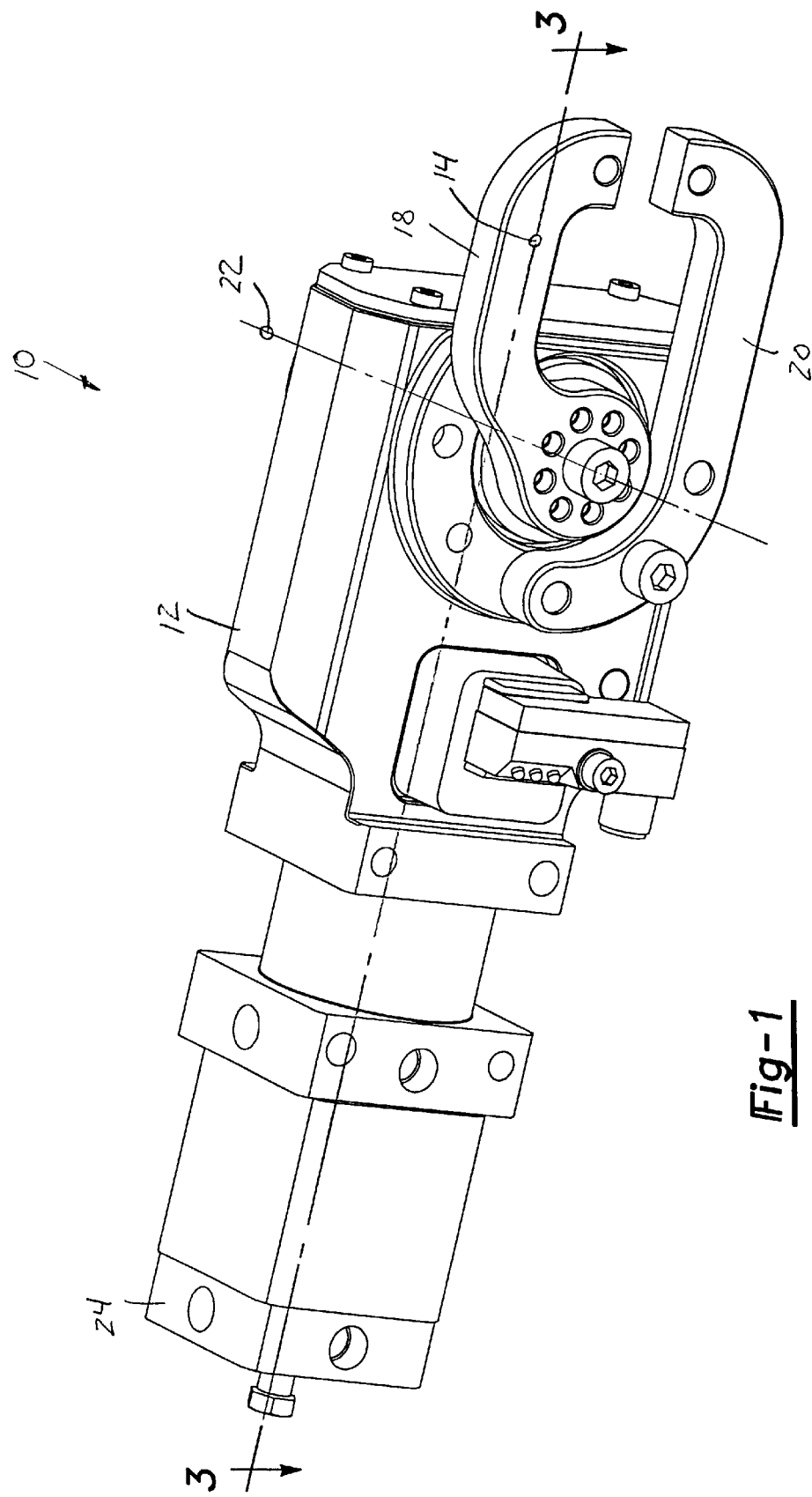
FIG. 1 is a perspective view of a sealed gripper showing a preferred embodiment of the gripper with gripper arms in a fully closed position.
Figure 5:
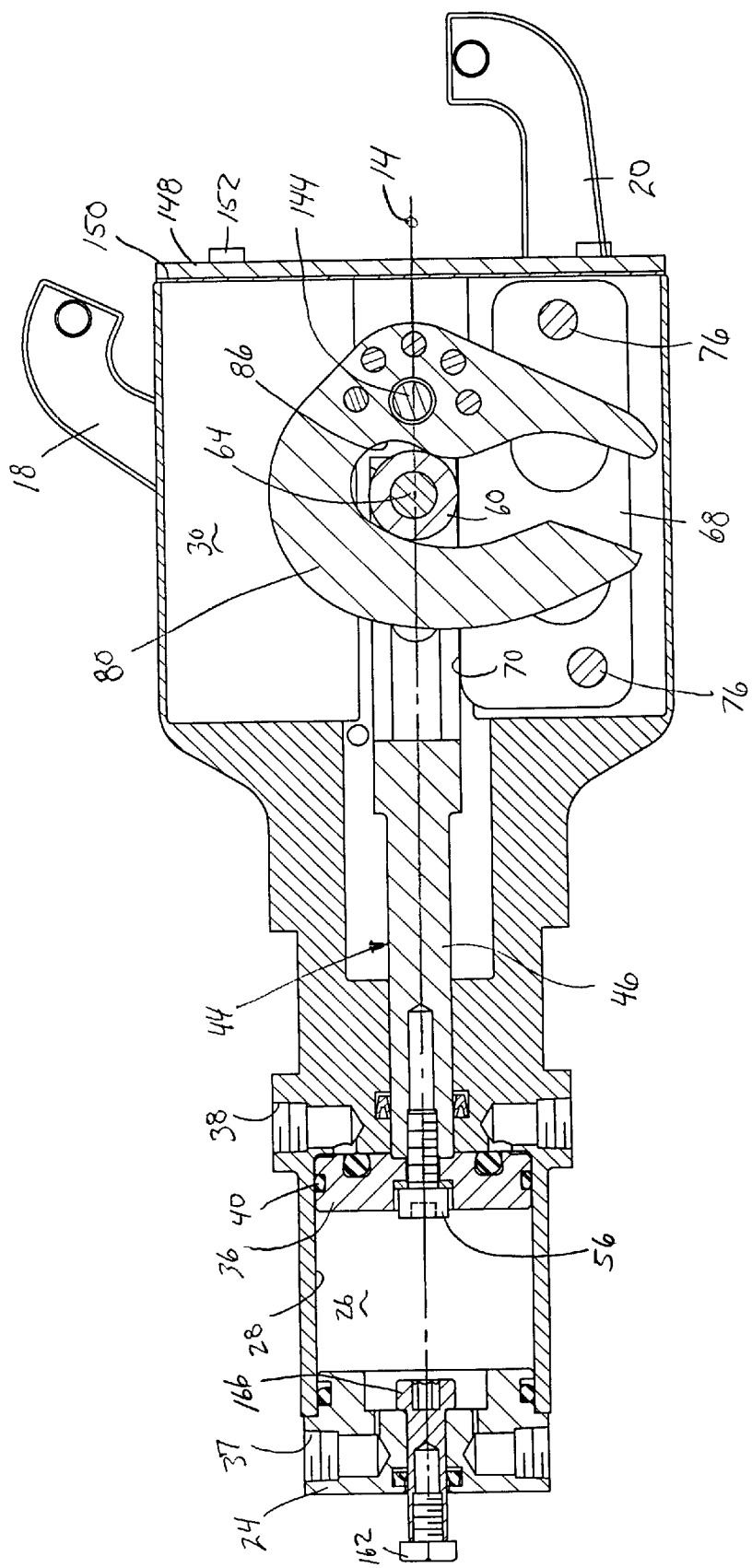
FIG. 5 is a cross-sectional side view showing the preferred embodiment of the gripper with gripper arms in a fully opened position.

With reference to FIG. 1, a sealed gripper constructed in accordance with the teachings of the present invention is generally identified at reference numeral 10. The sealed gripper 10 includes a body 12 defining a longitudinal axis 14 and an actuator mechanism 16 for rotating an inner arm 18 relative to an outer arm 20 about a transverse axis 22. The inner arm 18 and the outer arm 20 are positioned in FIG. 1 corresponding to a fully closed position. FIG. 5 depicts sealed gripper 10 of the present invention having inner arm 18 rotated about transverse axis 22 to a fully opened position.

As shown in FIGS. 2 and 3, sealed gripper 10 further includes a removable end cap 24 that defines a sealed cylindrical chamber 26 aligned with longitudinal axis 14. End cap 24 is preferably threadingly engaged to body 12. Additionally, an O-ring 27 provides a seal between end cap 24 and body 12.

Body 12 includes a cylindrical bore 28 extending along longitudinal axis 14 interconnecting chamber 26 with an actuating chamber 30. Actuating chamber 30 includes a cylindrical wall portion 32 and a pair of counter bores 34 located at each end of wall portion 32. A stop face 35 defines the end of each counter bore 34. Each of wall portions 32 is coaxially aligned with transverse axis 22.

Actuator mechanism 16 includes a piston 36 slidingly disposed within cylindrical chamber 26 for powered movement along longitudinal axis 14. Movement of piston 36 in an advancing or "arm opening" direction is caused by a supply of pneumatic fluid under pressure entering cylinder chamber 26 via a port 37 positioned in end cap 24. Similarly, movement of piston 36 in an opposite or "arm clamping" direction is caused by supplying pressurized fluid through a port 38 positioned in body 12. A seal 40 is disposed within a circumferential groove 42 to restrict the pressurized fluid from passing between piston 36 and body 12.

Actuator mechanism 16 further includes a slide 44 having a piston rod 46 and a clevis 48. Piston rod 46 is disposed and reciprocally slidable in bore 28. A seal 49 prevents pressurized fluid from passing between piston rod 46 and body 12. Clevis 48 includes a pair of bifurcated legs 50 extending generally parallel to, but offset from, longitudinal axis 14. Each of legs 50 includes an elongated slot 52 and an aperture 54 extending therethrough. Piston rod 46 is coupled to piston 36 via a threaded fastener 56 for a coincidental longitudinal and linear movement.

A roller assembly 58 includes an inner roller 60 and two outer rollers 62, all of which are journaled about a roller pin 64. A thrust washer 66 is disposed between each adjacent pair of rollers. A pair of snap rings 67 are snapped onto the laterally outboard ends of roller pin 64 for retaining the roller pin within apertures 54 of slide 44. Rollers 60 and 62 are preferably constructed from 6150 hot rolled steel, then hardened and ground to a Rockwell C hardness of 54–58.

Figure 6:
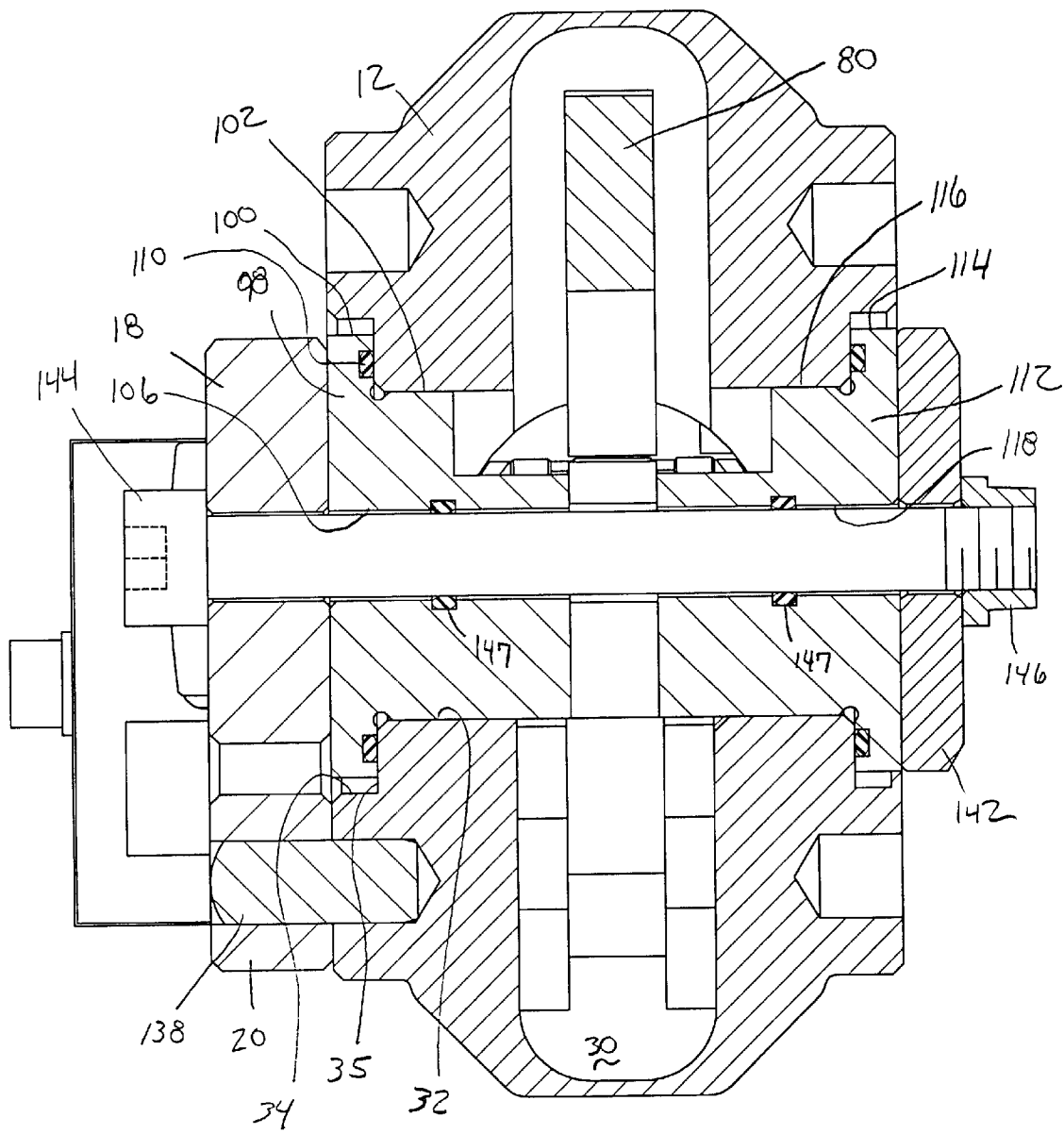
FIG. 6 is a cross-sectional end view of the gripper of the present invention taken along line 6—6 of FIG. 4.

With reference to FIGS. 3, 4 and 6, a pair of cam roller plates 68 are positioned within actuating chamber 30 substantially parallel to one another and offset from longitudinal axis 14. Each of cam roller plates 68 includes a roller surface 70, a hub relief 72 and a pair of apertures 74. A pair of generally cylindrical pins 76 are disposed within apertures 74 and corresponding apertures 78 located within body 12 to appropriately position and fix cam roller plate 68 relative to the body. Each of cam roller plates 68 is preferably constructed from 4140 hot rolled steel.

A drive arm 80 is formed from a substantially flat plate and includes a first finger 82 offset from a second finger 84. A camming surface 86 is defined by first finger 82 and second finger 84. As best shown in FIGS. 4 and 5, camming surface 86 includes an arcuate portion 88, a tapered flat portion 90 and a stepped or indented flat portion 92. Second finger 84 includes an aperture 94 aligned with transverse axis 22. Second finger 84 also includes a plurality of apertures 96 positioned circumferentially about and extending parallel to transverse axis 22.

A first hub 98 includes a generally circular cylindrical first portion 100 integrally formed with and axially aligned with a drive shank or second portion 102. First hub 98 is disposed within actuating chamber 30 and generally supported by cylindrical wall 32 for rotational movement about transverse axis 22. First hub 98 also includes a central aperture 106 extending along transverse axis 22. A plurality of apertures 108 are circumferentially positioned about transverse axis 22 extending generally parallel thereto. A seal 110 is compressed between first hub 98 and stop face 35.

A second hub 112 is substantially the mirror image of first hub 98 having a first portion 114, a second portion 116, a central aperture 118 and a plurality of circumferentially positioned apertures 120. Second hub 112 is also circumferentially supported by cylindrical wall 32 for rotation of movement about transverse axis 22.

As best shown in FIG. 2, outer arm 20 includes a proximal end having a plurality of apertures 132. An aperture 134 is positioned at the distal end of outer arm 20 to provide a coupling pivot point for a gripper pad (not shown). A threaded fastener 136 along with two dowel pins 138 fixedly mount outer arm 20 to body 12. Inner arm 18 includes a central aperture 126 and a plurality of circumferentially spaced apertures 128 positioned at its proximal end. At the distal end, an aperture 130 is provided to facilitate interconnection with a gripper pad (not shown). Dowel pins 140 drivingly interconnect inner arm 18, first hub 98, drive arm 80 and second hub 112. A hub cab 142 is also drivingly coupled to the aforementioned components via dowel pins 140. A threaded fastener 144 cooperates with a nut 146 to retain first hub 98 and second hub 112 within actuating chamber 30. Elastomeric seals 147 further prevent contaminants from entering actuating chamber 30 around fastener 144. A front cover 148 encloses actuating chamber 30. A gasket 150 and threaded fasteners 152 sealingly couple front cover 148 to body 12.

A proximity sensor 154 is coupled to body 12 proximate slot 52 of slide 50. Proximity sensor 154 operates to output a first signal 156 indicative of piston 36 being in the fully retracted position shown in FIGS. 3 and 4. Proximity sensor 154 also operates to output a second signal 158 when piston 36 and slide 50 are positioned in the fully extended, arms open, position shown in FIG. 5. A removable cover plate 159 is coupled to body 12 at an alternate proximity sensor location on the opposite side of body 12. It should be appreciated that proximity sensor 154, first arm 18 and second arm 20 may be positioned on either side of body 12 to provide mounting versatility of sealed gripper 10 in the work place. Body 12 also includes orthogonally oriented mounting flats 160 for coupling the body to a suitable fixture. A cylindrical surface 161 is formed on body 12 to provide further mounting flexibility for sealed gripper 10.

With reference to FIGS. 4–6, the operation of rotatable inner arm 18 in response to linear travel of slide 44 can be explained. Pressurized fluid entering port 37 causes piston 36 to translate along longitudinal axis 14. Because slide 50 is mechanically coupled to piston 36, the slide also translates along axis 14. Outer rollers 62 rotate about roller pin 64 as each outer roller contacts a corresponding roller surface 70 of cam roller plate 68.

Inner roller 60 is drivingly engaged with drive arm 80. Specifically, inner roller 60 engages camming surface 86 to induce a rotational moment about transverse axis 22. Because drive arm 80 is pinned to first hub 98, second hub 118 and inner arm 18, rotation of drive arm 80 directly corresponds to rotation of inner arm 18. Inner arm 18 reaches the fully opened arm position depicted in FIG. 5 once piston 36 bottoms within cylindrical bore 28.

To cause inner arm 18 to rotate in the clamping direction, pressurized fluid is input to port 38. The pressurized fluid acts upon piston 36 causing the piston and slide 44 to translate in the opposite direction along longitudinal axis 14. Inner roller 60 imparts a rotational moment to drive arm 80 as it passes through arcuate portion 88. A self-locking condition is achieved as the rollers are wedged between tapered flat portion 90 and roller surfaces 70. Preferably, tapered flat portion 90 is constructed at a five-degree angle to longitudinal axis 14 to provide a mechanical wedging effect. Indented flat portion 92 provides a detent to retain center roller 60 in position. One skilled in the art will appreciate that it is advantageous to lock inner arm 18 relative to outer arm 20 when in the clamped position shown in FIG. 4. Once center roller 60 is in contact with indented flat portion 92, arm 18 will remain in its clamped position without the presence of pressurized fluid at port 38. Thus, operators of sealed gripper 10 need not be concerned with tools or components unexpectedly becoming unclamped if a loss of pressure should occur.

A release mechanism 162 is slidingly disposed within an aperture 164 formed within end cap 24. Release mechanism 162 includes a driver 166 threadingly engaged with a fastener 168. A seal 170 is disposed within a groove 172 formed in aperture 164. When arm 18 is in the clamped position shown in FIG. 4, piston 36 is at the fully retracted position adjacent end cap 24. At this time, fastener 56 is aligned with and positioned proximate to driver 166. End cap 24 is constructed to assure that piston 36 may fully return and contact end cap 24 prior to bottoming on driver 166. To unlock center roller 60 from indented flat portion 92, a force is applied to fastener 168 to transfer load from driver 166 to fastener 56. A mallet may be used to provide the necessary force. Once center roller 60 is within tapered flat portion 90, fluid pressure entering port 37 causes arm 18 to rotate toward the opened position.

Therefore, it should be appreciated that the configuration and operation of the sealed gripper provides manufacturing and operational advantages over the prior art. Specifically, the present invention provides a sealed gripper suited for application in contaminated environments. Additionally, the assembly of an actuator, slide, drive arm, and hub arrangement allows for compact packaging and reduced mechanical movement of components.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A workpiece-engaging apparatus comprising:
    a body;
    an actuator movably supported by said body;
    a drive arm having a camming surface;
    a hub rotatably supported by said body, said drive arm drivingly coupled to said hub; and
    a roller operably riding along said camming surface, said roller being in contact with an indented portion positioned along said camming surface when said hub is in a gripping position so as to restrict movement of said hub away from said gripping position, said indented portion having a stepped surface forming a detent to retain said roller.

2. The workpiece-engaging apparatus of claim 1 further comprising a roller plate, said roller riding along a portion of said roller plate simultaneous with riding along said camming surface.

3. The workpiece-engaging apparatus of claim 2 wherein said drive arm includes a pair of bifurcated fingers and wherein said camming surface is positioned between said fingers.

4. The workpiece-engaging apparatus of claim 1 wherein said camming surface includes a flat portion positioned adjacent said indented portion.

5. The workpiece-engaging apparatus of claim 4 wherein said camming surface includes an arcuate portion against which said roller rides when said hub moves between an open position and said gripping position.

6. The workpiece-engaging apparatus of claim 1 wherein said drive arm is completely enclosed by said body.

7. The workpiece-engaging apparatus of claim 1 further including a workpiece-engaging arm movably coupled to said body wherein said workpiece-engaging arm operably moves in response to said actuator.

8. The workpiece-engaging apparatus of claim 1 further including an actuator chamber integrally formed with said body wherein said actuator is positioned within said actuator chamber.

9. The workpiece-engaging apparatus of claim 1 wherein said body includes a substantially cylindrical mounting portion and a substantially rectangular mounting portion.

10. A gripper comprising:
    a body;
    an actuator movably supported by said body;
    a first hub rotatably supported by said body, said first hub operably rotating about a transverse axis;
    a drive arm having a camming surface, said drive arm being coupled to said first hub so as to be rotatable about said transverse axis;
    a workpiece-engaging arm coupled to said first hub; and
    a member drivingly interconnecting said camming surface and said actuator wherein said member is operable to move across said camming surface to move said workpiece-engaging arm in response to said actuator.

11. The gripper of claim 10 further including a second hub rotatably supported by said body, wherein said second hub rotates about said transverse axis.

12. The gripper of claim 11 wherein said drive arm is sandwiched between said first and second hubs.

13. The gripper of claim 10 wherein said member is a roller.

14. The gripper of claim 13 further including a roller support surface wherein said roller simultaneously contacts said roller support surface and said camming surface.

15. The gripper of claim 14 wherein said camming surface includes an indented portion, wherein said roller contacts said indented portion when said workpiece-engaging arm is in a gripping position.

16. The gripper of claim 15 wherein said camming surface includes an arcuate portion against which said roller rides when said workpiece-engaging arm moves between an open position and said gripping position.

17. The gripper of claim 10 wherein said body includes a substantially cylindrical mounting portion and a substantially rectangular mounting portion.

18. A gripper comprising:
    a body having a bore;
    first and second hubs rotatably supported by said body;
    a platen slidably disposed within said bore;
    a roller coupled to said piston for movement therewith; and
    a drive arm having a camming surface, said roller operably engaging said camming surface such that axial displacement of said piston causes rotational movement of said first and second hubs.

19. The gripper of claim 18 wherein said drive arm is positioned within a cavity defined by said body.

20. The gripper of claim 18 further including a first arm coupled to one of said first and second hubs wherein said arm is moveable from an open position to a gripping position.

21. The gripper of claim 20 further including a second arm fixed to said body.

22. The gripper of claim 18 wherein said camming surface includes an indented portion, wherein said roller contacts said indented portion when said arm is in a gripping position.

23. The gripper of claim 22 wherein said camming surface includes an arcuate portion against which said roller rides when said arm moves between an open position and said gripping position.

24. The gripper of claim 18 wherein said drive arm includes a pair of bifurcated fingers and wherein said camming surface is positioned between said fingers.

25. An actuator for a mechanical device having a body, the actuator comprising:
    a piston linearly movable within an actuation chamber of said body;
    a slide coupled to said piston;
    a roller rotatably coupled to said slide;
    a drive arm having a camming surface, said drive arm being rotatably coupled to said body, said roller drivingly engaging and moving along said camming surface such that linear displacement of said slide causes rotation of said drive arm;
    a first hub coupled to said drive arm and rotatably supported by said body; and
    a workpiece-engaging arm coupled to said first hub, wherein said workpiece-engaging arm operably moves in a first direction in response to said piston moving in a first direction and wherein said workpiece-engaging arm operably moves in a second direction in response to said piston moving in a second direction.

26. The actuator of claim 25 wherein said camming surface includes an indented portion and wherein said roller is in contact with said indented portion when said piston is at a fully retracted position.

27. The actuator of claim 26 further including a second hub co-axially aligned with said first hub and wherein said drive arm is sandwiched between said first and second hubs.

28. A workpiece-engaging apparatus comprising:
    a body;
    an actuator movably supported by said body;
    a drive arm having a pair of bifurcated fingers and a camming surface, said camming surface being positioned between said fingers;
    a hub rotatably supported by said body, said drive arm drivingly coupled to said hub; and
    a roller operably riding along said camming surface, said roller being in contact with an indented portion positioned along said camming surface when said hub is in a gripping position so as to restrict movement of said hub away from said gripping position.

29. A workpiece-engaging apparatus comprising:

a body;

an actuator movably supported by said body;

a drive arm having a camming surface;

a hub rotatably supported by said body, said drive arm drivingly coupled to said hub; and a roller operably riding along said camming surface, said roller being in contact with an indented portion positioned along said camming surface when said hub is in a gripping position so as to restrict movement of said hub away from said gripping position, said camming surface including a flat portion positioned adjacent said indented portion.

30. The workpiece-engaging apparatus of claim 29 wherein said camming surface includes an arcuate portion against which said roller rides when said hub moves between an open position and said gripping position.

31. A workpiece-engaging apparatus comprising:

a body;

an actuator movably supported by said body;

a drive arm having a camming surface, said drive arm being completely enclosed by said body;

a hub rotatably supported by said body, said drive arm drivingly coupled to said hub; and a roller operably riding along said camming surface, said roller being in contact with an indented portion positioned along said camming surface when said hub is in a gripping position so as to restrict movement of said hub away from said gripping position.

32. A workpiece-engaging apparatus comprising:

a body;

an actuator movably supported by said body;

a drive arm having a camming surface;

a hub rotatably supported by said body, said drive arm drivingly coupled to said hub;

a roller operably riding along said camming surface, said roller being in contact with an indented portion positioned along said camming surface when said hub is in a gripping position so as to restrict movement of said hub away from said gripping position; and a workpiece-engaging arm moveably coupled to said body, wherein said workpiece-engaging arm operably moves in response to said actuator.

33. A workpiece-engaging apparatus comprising:

a body having an integrally formed actuator chamber;

an actuator movably supported by said body and positioned within said actuator chamber;

a drive arm having a camming surface;

a hub rotatably supported by said body, said drive arm drivingly coupled to said hub; and a roller operably riding along said camming surface, said roller being in contact with an indented portion positioned along said camming surface when said hub is in a gripping position so as to restrict movement of said hub away from said gripping position.

34. A gripper comprising:

a body;

an actuator movably supported by said body;

first and second hubs rotatably supported by said body, said first and second hubs operably rotating about a transverse axis;

a drive arm having a camming surface, said drive arm being coupled to said first hub so as to be rotatable about said transverse axis;

a workpiece-engaging arm coupled to said first hub; and a member drivingly interconnecting said camming surface and said actuator wherein said workpiece-engaging arm operably moves in response to said actuator.

35. The gripper of claim 34 wherein said drive arm is sandwiched between said first and second hubs.

36. An actuator for a mechanical device having a body, the actuator comprising:

a piston linearly movable within an actuation chamber of said body;

a slide coupled to said piston;

a roller rotatably coupled to said slide;

a drive arm having a camming surface including an indented portion, said drive arm being rotatably coupled to said body, said roller drivingly engaging said drive arm such that linear displacement of said slide causes rotation of said drive arm, said roller being in contact with said indented portion when said piston is at a fully retracted position;

a first hub coupled to said drive arm and rotatably supported by said body; and a workpiece-engaging arm coupled to said first hub, wherein said workpiece-engaging arm operably moves in a first direction in response to said piston moving in a first direction and wherein said workpiece-engaging arm operably moves in a second direction in response to said piston moving in a second direction.

\* \* \* \* \*

UNITED STATES PATENT AND TRADEMARK OFFICE
CERTIFICATE OF CORRECTION

PATENT NO. : 6,666,489 B2
DATED : December 23, 2003
INVENTOR(S) : Dean J. Kruger It is certified that error appears in the above-identified patent and that said Letters Patent is hereby corrected as shown below:

<u>Column 4,</u>
Line 52, "department" should be -- departing --.

<u>Column 5,</u>
Line 67, "platen" should be -- piston --.

Signed and Sealed this

Seventh Day of September, 2004

JON W. DUDAS
*Director of the United States Patent and Trademark Office*